United States Patent
Teguri et al.

(10) Patent No.: US 7,532,429 B2
(45) Date of Patent: May 12, 2009

(54) WRITE-HEAD POSITIONING METHOD AND DISK DRIVE

(75) Inventors: Hironori Teguri, Kawasaki (JP); Masaya Ohtake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/030,446

(22) Filed: Feb. 13, 2008

(65) Prior Publication Data

US 2008/0198502 A1 Aug. 21, 2008

(30) Foreign Application Priority Data

Feb. 16, 2007 (JP) ............... 2007-036269

(51) Int. Cl.
*G11B 5/596* (2006.01)

(52) U.S. Cl. .................................. 360/77.06

(58) Field of Classification Search ............. 360/77.06, 360/75, 77.05, 77.08, 78.07, 22; 369/47.25, 369/124.11; 386/70
See application file for complete search history.

(56) References Cited

U.S. PATENT DOCUMENTS

| | | | | |
|---|---|---|---|---|
| 4,438,465 A | * | 3/1984 | Moriya et al. | 360/22 |
| 4,470,078 A | * | 9/1984 | Hirata et al. | 386/70 |
| 5,235,478 A | | 8/1993 | Hoshimi et al. | |
| 5,523,900 A | * | 6/1996 | Kosugi et al. | 360/77.05 |
| 5,726,825 A | * | 3/1998 | Phan et al. | 360/78.07 |
| 5,751,513 A | * | 5/1998 | Phan et al. | 360/78.07 |
| 5,760,992 A | * | 6/1998 | Phan et al. | 360/78.07 |
| 5,892,634 A | * | 4/1999 | Ito et al. | 360/77.08 |
| 6,735,162 B2 | * | 5/2004 | Armitage et al. | 369/124.11 |
| 6,762,982 B2 | * | 7/2004 | Armitage | 369/47.25 |
| 2005/0128632 A1 | | 6/2005 | Nakamura et al. | |
| 2006/0002017 A1 | | 1/2006 | Taguchi et al. | |

FOREIGN PATENT DOCUMENTS

| | | |
|---|---|---|
| JP | 03-187074 | 8/1991 |
| JP | A 2005-166115 | 6/2005 |
| JP | A 2005-166116 | 6/2005 |
| JP | A 2006-18902 | 1/2006 |
| JP | A 2006-31846 | 2/2006 |

* cited by examiner

*Primary Examiner*—Fred Tzeng
(74) *Attorney, Agent, or Firm*—Greer, Burns & Crain, Ltd.

(57) ABSTRACT

A write-head positioning method includes steps of positioning a write head on a first track of a storage medium on the basis of a servo signal and writing a signal on the first track, positioning the write head on second and third tracks located adjacent to opposite sides of the first track on the basis of servo signals and writing signals on the second track and the third track, positioning the read head at positions on the first track that are set at a predetermined interval in a track-width direction, and reading a signal from the first track at each position thereof, determining a signal profile that indicates a fluctuation of output values of the signals read at the respective positions on the first track, and detecting a peak position indicating a maximum output value in the determined signal profile.

6 Claims, 10 Drawing Sheets

WRITE-HEAD POSITIONING METHOD AND DISK DRIVE

BACKGROUND

1. Field of the Art

The present application relates to a positioning method for positioning a write head.

2. Description of the Related Art

In hard-disk drive (HDD) devices, so-called skew angles are set for floating head sliders. Specifically, a skew angle is defined as an angle of intersection between a center line of a floating head slider in the anterior-posterior direction thereof and a center line of a recording track extending in the circumferential direction of a magnetic disk. Thus, even if a read head is positioned on a center line of a recording track, the skew angle causes a write head to be misaligned with the center line of the recording track in the radial direction of the magnetic disk. Such misalignment is compensated for by an offset amount.

For example, as disclosed in Japanese Unexamined Patent Application Publication No. 2005-166115, in order to calculate an offset amount, a read head reads out signals at positions on a single track that are set at predetermined intervals in the radial direction of a magnetic disk. Then, a peak position of output values of these signals is determined. As a result, a distance between the peak position and the center line of the track, namely, an offset amount, is determined. When writing signals, a write head is positioned on a recording track in accordance with the predetermined offset amount.

SUMMARY

In accordance with an aspect of the invention, a write-head positioning method includes steps of positioning a write head on a first track of a storage medium on the basis of a servo signal read by a read head and writing a signal on the first track. The write head is positioned on second and third tracks located adjacent to opposite sides of the first track on the basis of servo signals read by the read head and signals are written on the second track and the third track. The read head is then positioned at places on the first track that are set at a predetermined interval in a track-width direction, and a signal is read from the first track at each place thereof. A signal profile that indicates a fluctuation of output values of the signals read at the respective positions on the first track is determined, and a peak position indicating a maximum output value in the determined signal profile is detected.

DETAILED DESCRIPTION OF THE PREFERRED EMBODIMENTS

An embodiment of the present application will now be described with reference to the attached drawings.

Figure 1:
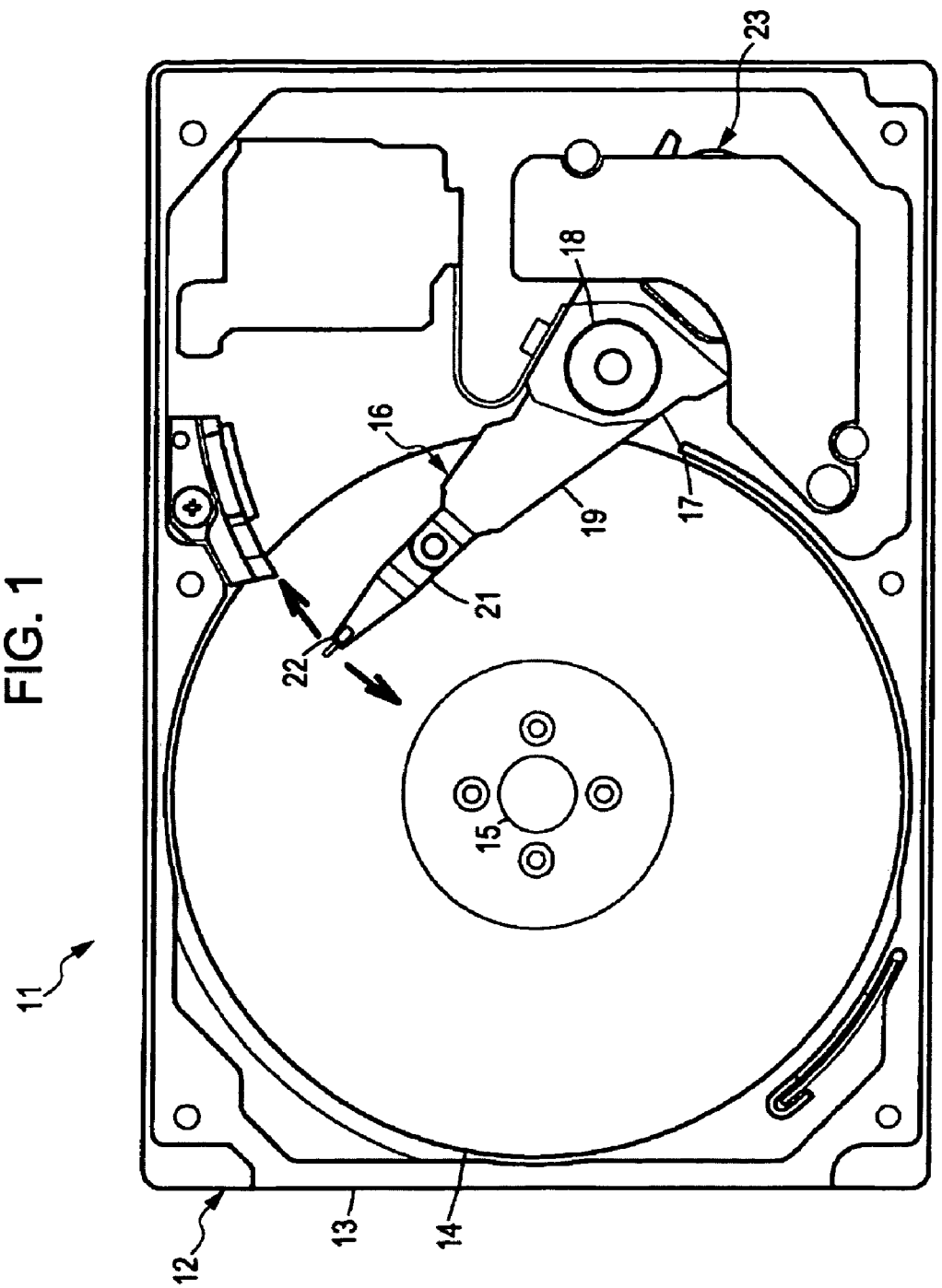
FIG. 1 is a plan view schematically showing an internal structure of a hard-disk drive device (HDD), which is a specific example of a storage-medium drive device.

FIG. 1 schematically illustrates an internal structure of a hard-disk drive device (HDD) 11, which is a specific example of a storage-medium drive device. The HDD 11 is equipped with a housing 12. The housing 12 includes a box-shaped base 13 and a cover (not shown). The base 13 defines a flat, rectangular-parallelepiped internal space, namely, an accommodation space. The base 13 may be formed by molding using a metallic material such as aluminum. The cover is joined to an opening of the base 13. The accommodation space is sealed between the cover and the base 13. The cover may be formed by pressing using a single plate material.

The accommodation space accommodates at least one magnetic disk 14 serving as a storage medium. The magnetic disk 14 is mounted on a rotary shaft of a spindle motor 15. The spindle motor 15 can rotate the magnetic disk 14 at a high speed of, for example, 5400 rpm, 7200 rpm, 10000 rpm, or 15000 rpm.

The accommodation space also accommodates a carriage 16. The carriage 16 is equipped with a carriage block 17. The carriage block 17 is rotatably connected to a spindle 18 that extends in the vertical direction. The carriage block 17 has a rigid carriage arm 19 that extends in the horizontal direction from the spindle 18. The carriage block 17 may be formed by molding using aluminum. As is generally known, if the accommodation space accommodates a plurality of magnetic disks 14, an adjacent pair of magnetic disks 14 has one carriage arm 19 disposed therebetween.

The carriage arm 19 has a head suspension 21 attached to a tip end thereof. The head suspension 21 extends anteriorly from the tip end of the carriage arm 19. The head suspension 21 has an anterior end that supports a floating head slider 22. The floating head slider 22 is disposed facing a front face of the magnetic disk 14. As is generally known, if the accommodation space accommodates a plurality of magnetic disks 14, a carriage arm 19 between an adjacent pair of magnetic disks 14 supports two head suspensions 21.

The floating head slider 22 has an electromagnetic transducer disposed thereon. A detailed description of an electromagnetic transducer will be provided hereinafter. The head suspension 21 exerts a pressing force on the floating head slider 22 towards the front face of the magnetic disk 14. When the magnetic disk 14 rotates, an air current is produced over the front face of the magnetic disk 14. This air current produces buoyancy on the floating head slider 22. When the pressing force from the head suspension 21 and the buoyancy are balanced out, the floating head slider 22 can float continuously with relatively high rigidity in the course of rotation of the magnetic disk 14.

The carriage block 17 is connected to a head positioning mechanism, namely, a voice coil motor (VCM) 23. The VCM 23 allows the carriage block 17 to rotate about the spindle 18. The carriage arm 19 and the head suspension 21 can pivot in accordance with the rotation of the carriage block 17. When the carriage arm 19 pivots about the spindle 18 while the floating head slider 22 is in a floating state, the floating head slider 22 can radially traverse the front face of the magnetic disk 14. Based on this radial movement of the floating head slider 22, the electromagnetic transducer can be positioned on a target recording track.

Figure 2:
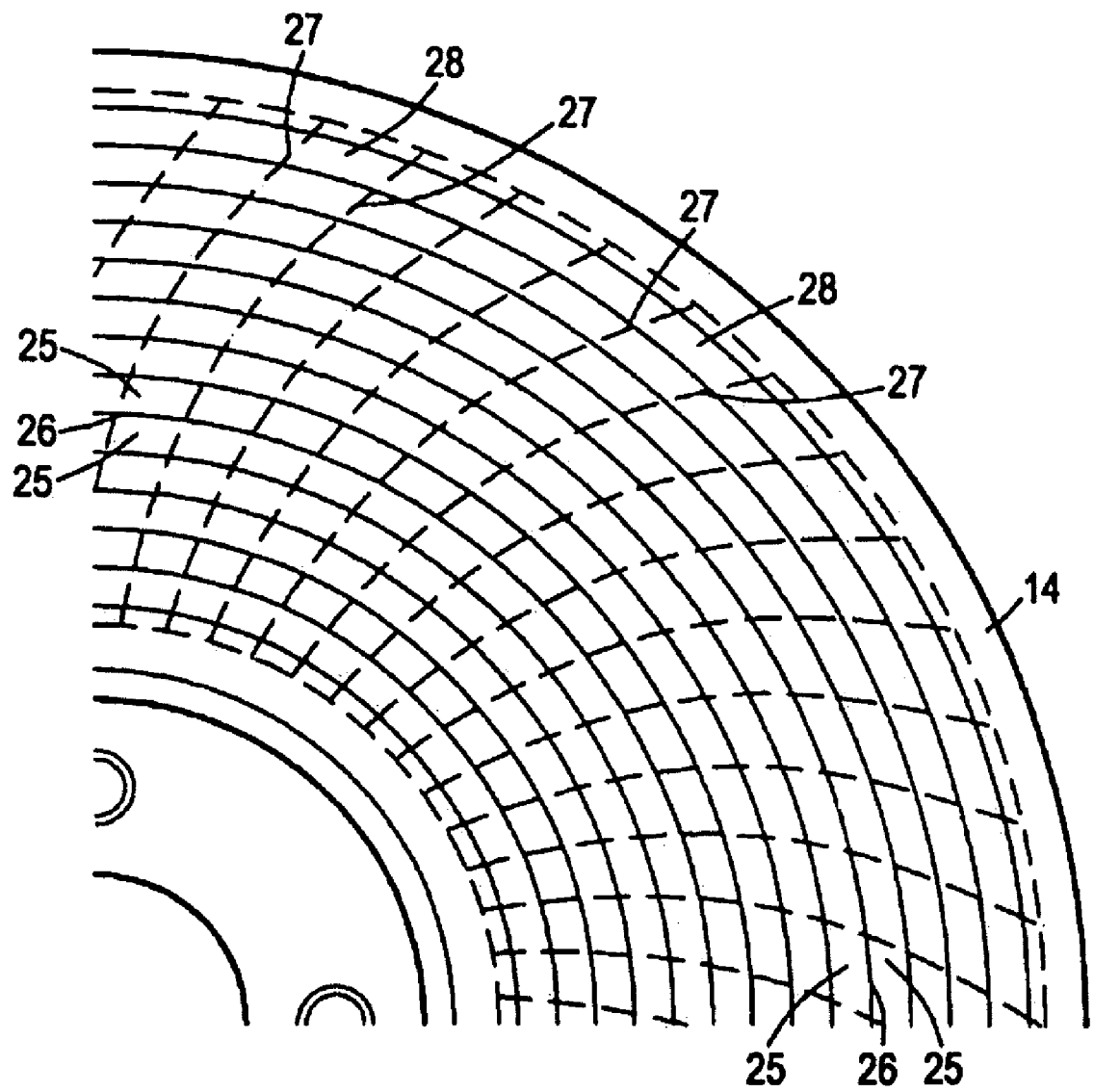
FIG. 2 is a partial plan view of a magnetic disk.

FIG. 2 schematically illustrates a structure of the magnetic disk 14. The front and rear faces of the magnetic disk 14 each have a plurality of recording tracks 25 that extend in the circumferential direction of the magnetic disk 14. The recording tracks 25 are provided in a concentric pattern. The recording tracks 25 are formed of a magnetic material. Magnetic information can be written on each recording track 25. Every adjacent pair of recording tracks 25 is separated from each other by a non-recordable track, namely, a separation track 26. Similar to the recording tracks 25, the separation tracks 26 extend concentrically in the circumferential direction of the magnetic disk 14. The separation tracks 26 are formed of a nonmagnetic material.

The front and rear faces of the magnetic disk 14 each have a plurality of (e.g. 60) servo-sector regions 27 extending in a curve form in the radial direction of the magnetic disk 14. As will be described hereinafter, a servo pattern is established in each of the servo-sector regions 27. The curvature of the servo-sector regions 27 is set in accordance with the traveling path of the electromagnetic transducer. Each adjacent pair of servo-sector regions 27 has a data region 28 therebetween. Magnetic information, i.e. binary information, can be written on a recording track 25 within each data region 28.

Figure 3:
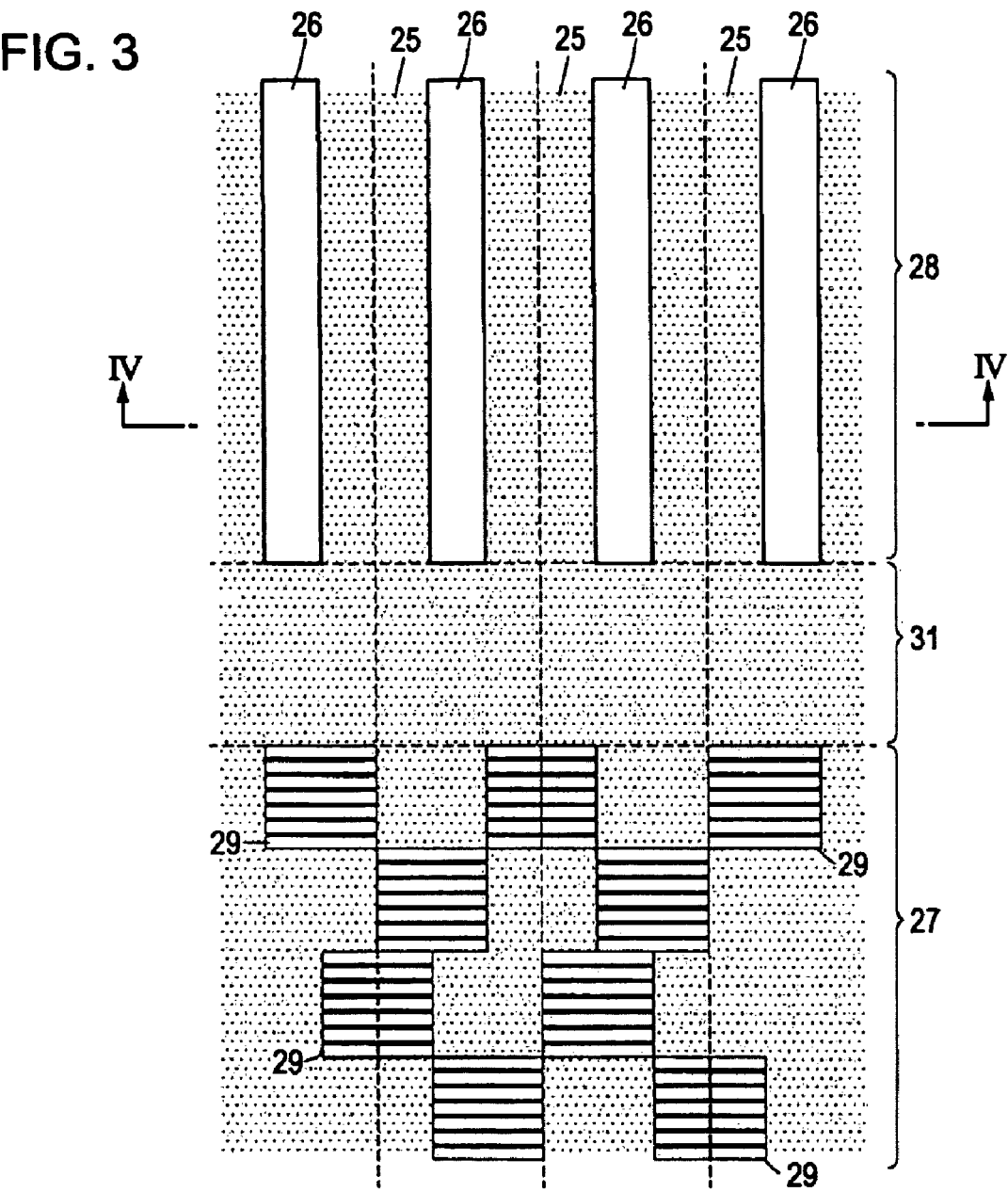
FIG. 3 is a partially enlarged plan view of a front face of the magnetic disk.

Referring to FIG. 3, a servo pattern 29 is established in each servo-sector region 27. The servo-sector regions 27 and the data regions 28 have signal-profile measurement regions 31 therebetween. The signal-profile measurement regions 31 extend in a curve form along the servo-sector regions 27 in the radial direction of the magnetic disk 14. The signal-profile measurement regions 31 are formed of a magnetic material. As will be described hereinafter, each signal-profile measurement region 31 is used for determining a signal profile.

Figure 4:
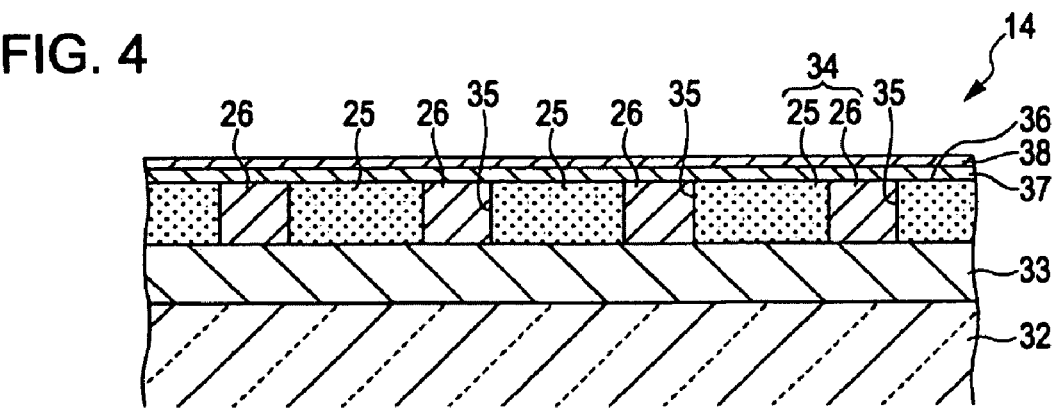
FIG. 4 is a cross-sectional view taken along line IV-IV in FIG. 3.

Referring to FIG. 4, the magnetic disk 14 is equipped with a substrate 32. The substrate 32 may be, for example, a glass substrate. A soft-magnetic backing layer 33 extends over the front face of the substrate 32. In the backing layer 33, an easy magnetization axis is established in the in-plane direction set parallel to the front face of the substrate 32. A magnetic recording layer 34 extends over the front face of the backing layer 33. In the magnetic recording layer 34, an easy magnetization axis is established in the vertical direction that is orthogonal to the front face of the substrate 32. The aforementioned recording tracks 25 are established in the magnetic recording layer 34.

The magnetic recording layer 34 has grooves 35. The grooves 35 have a nonmagnetic material embedded therein, whereby the aforementioned separation tracks 26 are established therein. The front face of the recording tracks 25 and the front face of the separation tracks 26 form a flat surface 36. The flat surface 36 may be coated with a protective film 37, such as a diamond-like carbon (DLC) film, and a lubricating film 38, such as a perfluoro polyether (PFPE) film. Such a magnetic disk 14 serves as a so-called perpendicular magnetic disk.

Figure 5:
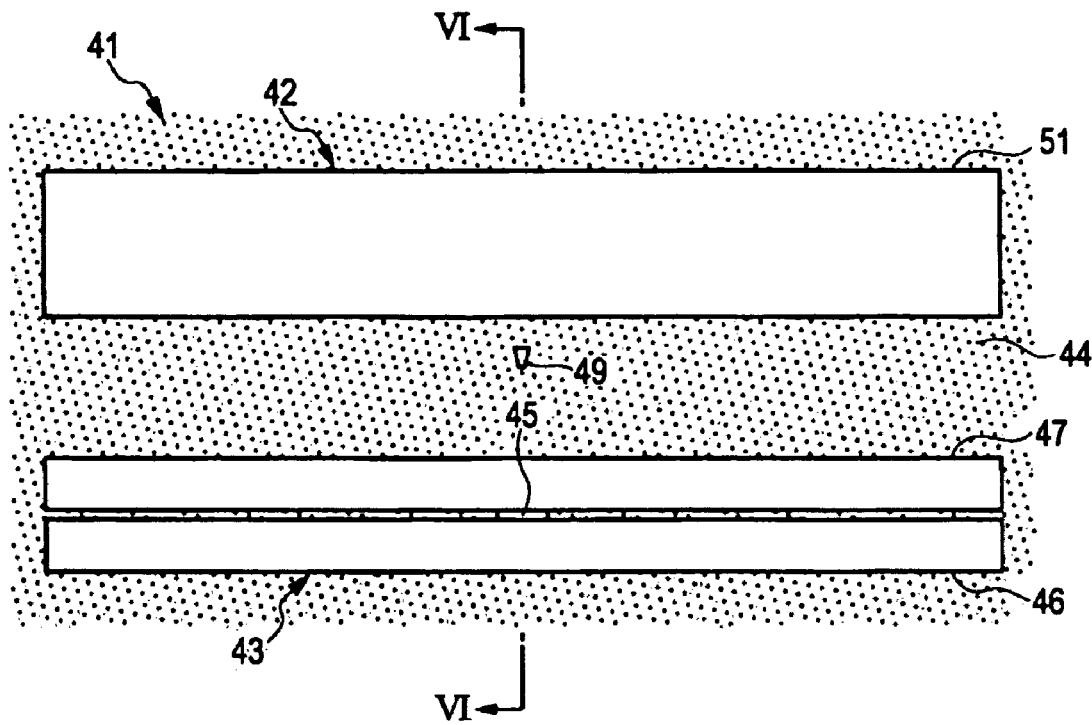
FIG. 5 is an enlarged front view of an electromagnetic transducer.

FIG. 5 illustrates an electromagnetic transducer 41 in detail. The electromagnetic transducer 41 includes a write head element, i.e. a single-pole-type head 42, and a read head element 43. As is generally known, the single-pole-type head 42 can write binary information on the magnetic disk 14 using, for example, a magnetic field generated by a magnetic coil. The read head element 43 may be, for example, a giant magneto-resistive (GMR) element or a magneto-resistive (MR) element such as a tunnel magento-resistive (TMR) element. As is commonly known, the read head element 43 can detect binary information on the basis of resistance that changes in accordance with a magnetic field from the magnetic disk 14.

The single-pole-type head 42 and the read head element 43 are embedded in a nonmagnetic insulating film, that is, an element-containing film 44, of the floating head slider 22. In the read head element 43, a magneto-resistive film 45 such as a tunnel junction film is sandwiched between a pair of lower and upper conductive layers, namely, a lower shielding layer 46 and an upper shielding layer 47. The lower shielding layer 46 and the upper shielding layer 47 may be composed of a magnetic material such as FeN or NiFe. The distance between the lower shielding layer 46 and the upper shielding layer 47 determines the resolution of magnetic recording in the linear direction of the recording tracks on the magnetic disk 14.

Figure 6:
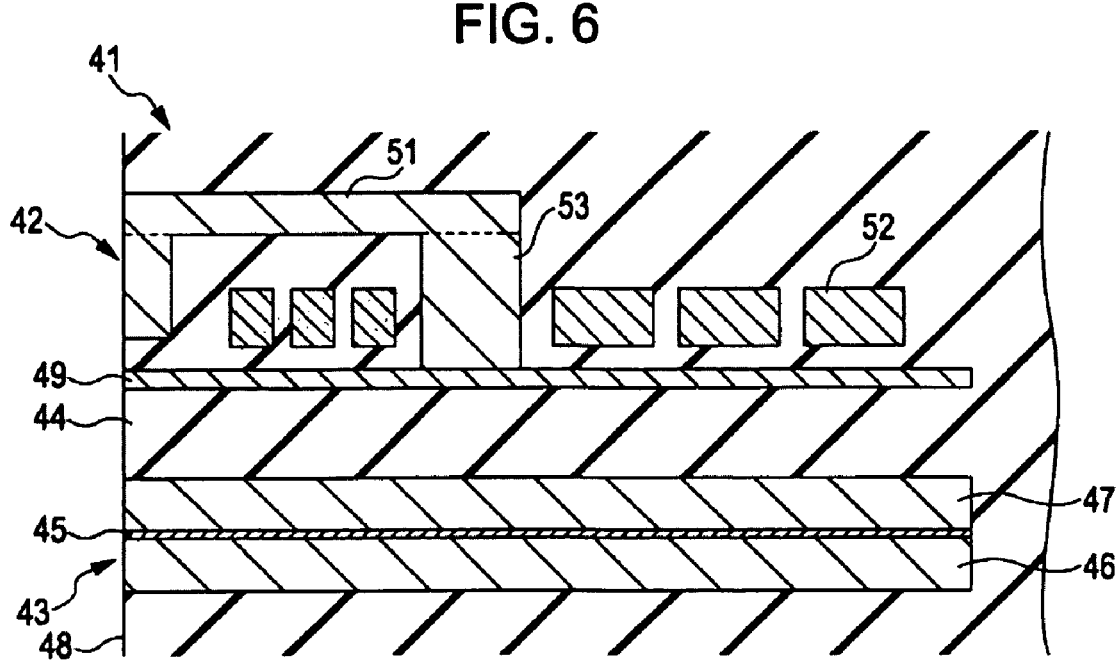
FIG. 6 is a cross-sectional view taken along line VI-VI in FIG. 5.

The single-pole-type head 42 has a main pole 49 and a subsidiary pole 51 that extend posteriorly from an air bearing surface 48, which serves the anterior end of the floating head slider 22 and is where the main pole 49 and the subsidiary pole 51 are exposed. The main pole 49 and the subsidiary pole 51 may be composed of a magnetic material such as FeN or NiFe. Referring also to FIG. 6, the main pole 49 and the subsidiary pole 51 have a magnetic coil, that is, a thin film coil 52, provided therebetween. The main pole 49 is magnetically connected to the subsidiary pole 51 by means of a connection segment 53 at a center position of the thin film coil 52. Accordingly, the main pole 49, the subsidiary pole 51, and the connection segment 53 constitute a magnetic core that extends through the center position of the thin film coil 52.

Figure 7:
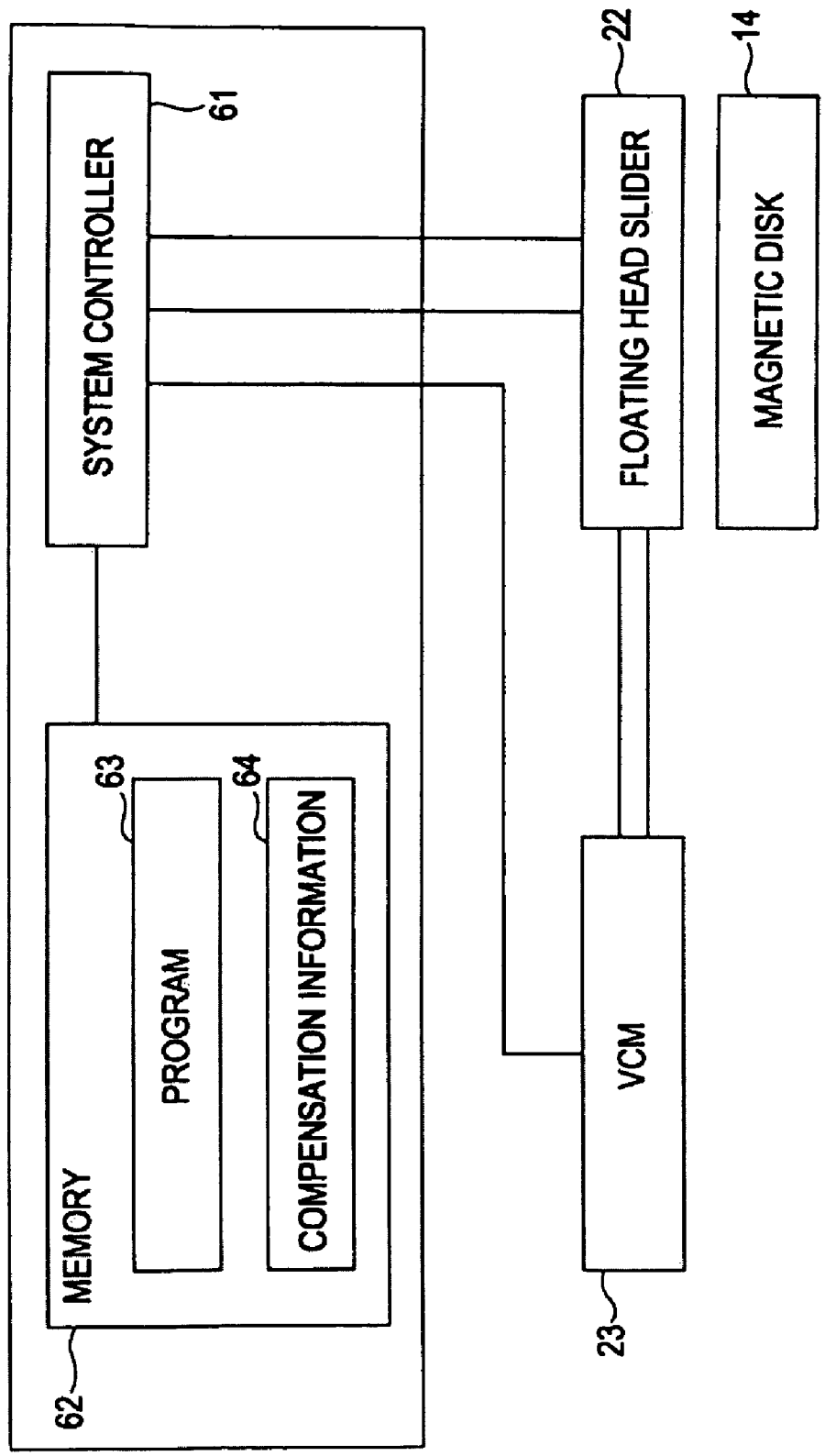
FIG. 7 is a block diagram schematically showing a control system of the HDD.

Referring to FIG. 7, the HDD 11 contains a processor, that is, a system controller 61. The system controller 61 is connected to a memory 62. The memory 62 stores a so-called application software program 63. The system controller 61 performs a calculation process on the basis of the program 63. The memory 62 may be, for example, a nonvolatile memory. The memory 62 stores compensation information 64. The compensation information 64 specifies an offset amount of the electromagnetic transducer 41, i.e. the single-pole-type head 42, in the radial direction of the magnetic disk 14 at the time of a writing process of binary information. An offset amount is set individually for groups of recording tracks 25, each group consisting of a predetermined number of neighboring recording tracks 25. In this case, for example, fifteen groups of recording track 25 are set. A method for calculating an offset amount will be described in detail hereinafter.

The system controller 61 is connected to the floating head slider 22, that is, the electromagnetic transducer 41. At the time of a writing process of binary information, a write current is supplied from the system controller 61 to the thin film coil 52 of the single-pole-type head 42. This generates a magnetic field in the thin film coil 52, causing a magnetic flux to flow through the main pole 49, the subsidiary pole 51, and the connection segment 53. The magnetic flux leaks out from the air bearing surface 48. The leaking magnetic flux creates a recording magnetic field. In this manner, binary information is written on the magnetic disk 14. On the other hand, at the time of a reading process of binary information, a sensing current is supplied from the system controller 61 to the read head element 43. The resistance of the read head element 43 changes in accordance with a magnetic field applied to the read head element 43 from the magnetic disk 14. The change in resistance of the read head element 43 appears as a voltage change in the sensing current. A reproduction signal detected on the basis of the voltage change is supplied to the system controller 61.

At the time of a reading process of binary information, the system controller 61 determines the position of the read head element 43 on the basis of a binary signal detected by the read head element 43 in accordance with the servo pattern 29 of the corresponding servo-sector region 27. On the other hand, at the time of a writing process of binary information, positional information is produced on the basis of a binary signal detected in accordance with the corresponding servo pattern 29. The system controller 61 performs compensation on the positional information in accordance with the offset amount specified in the compensation information 64. Based on the compensated positional information, a positioning signal is generated and supplied to the VCM 23. The VCM 23 rotates the carriage 16 about the spindle 18 on the basis of the positioning signal. In accordance with the rotation of the carriage 16, the single-pole-type head 42 is positioned at a desired radial position on the magnetic disk 14.

Figure 8:
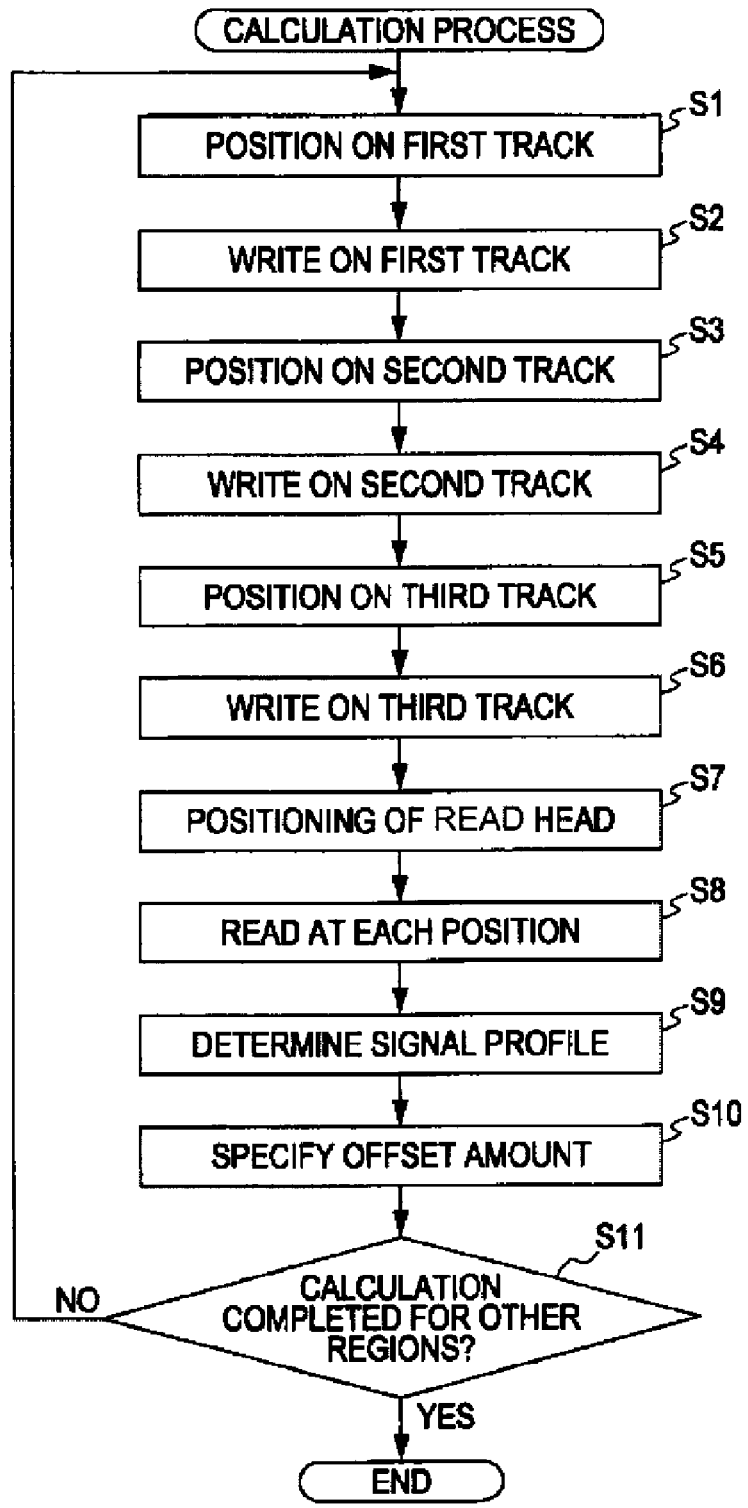
FIG. 8 is a flow chart schematically showing a procedure for calculating an offset amount.
Figure 9:
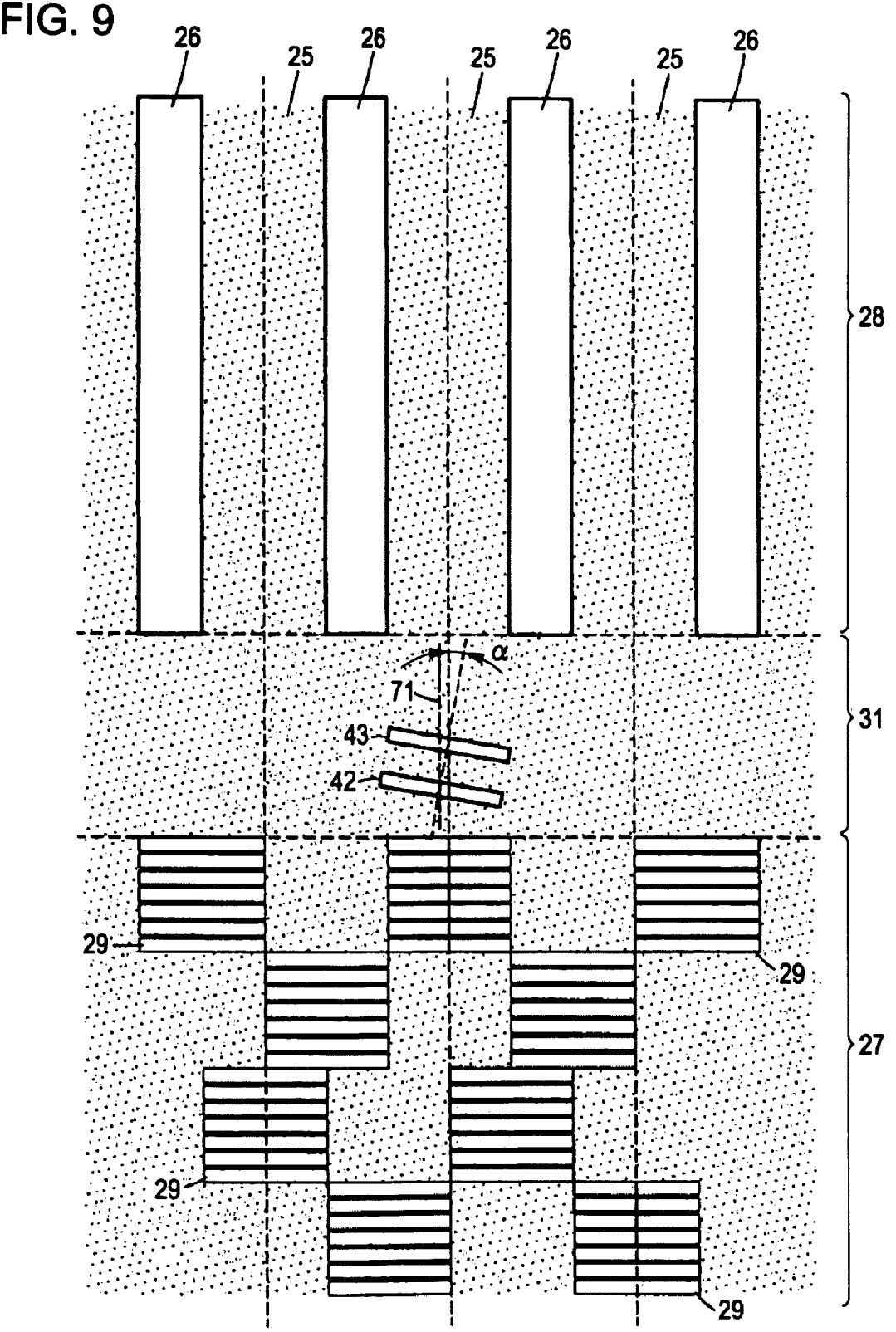
FIG. 9 is a plan view schematically showing a state where binary information is written on a first track.

A method for calculating an offset amount of the single-pole-type head 42 will now be described. An offset amount is calculated prior to, for example, shipment of the HDD 11. The HDD 11 is connected to, for example, a host computer (not shown). The host computer supplies the HDD 11 with power. The system controller 61 activates the program 63. Referring to FIG. 8, in step S1, the system controller 61 supplies the VCM 23 with a positioning signal for the read head element 43. The VCM 23 allows the carriage 16 to pivot about the spindle 18 so that the floating head slider 22 can be positioned on an arbitrarily designated recording track 25. The read head element 43 reads a servo signal from the servo pattern 29 of the corresponding servo-sector region 27. Referring to FIG. 9, the read head element 43 is positioned on a center line of the arbitrarily designated recording track 25 on the basis of the servo signal. In this case, a recording track 25 closer towards the outer periphery is selected on the magnetic disk 14.

On the magnetic disk 14, a predetermined skew angle a is defined between the center line of the floating head slider 22 in the anterior-posterior direction thereof and the center line of the recording track 25. In this case, a skew angle α of, for example, 10° is established. As a result, the single-pole-type head 42 is misaligned from the center line of the recording track 25 radially towards the outer periphery of the magnetic disk 14 by a predetermined amount of misalignment. The single-pole-type head 42 is thus positioned on a first track 71 in the corresponding signal-profile measurement region 31. In this case, the system controller 61 outputs a predetermined write signal to the single-pole-type head 42 in step S2. Based on the write signal, the single-pole-type head 42 writes binary information on the first track 71. The orientation of magnetization of the binary information may be established alternately in the circumferential direction of the magnetic disk 14. The read head element 43 continuously follows the center line of the recording track 25.

Figure 10:
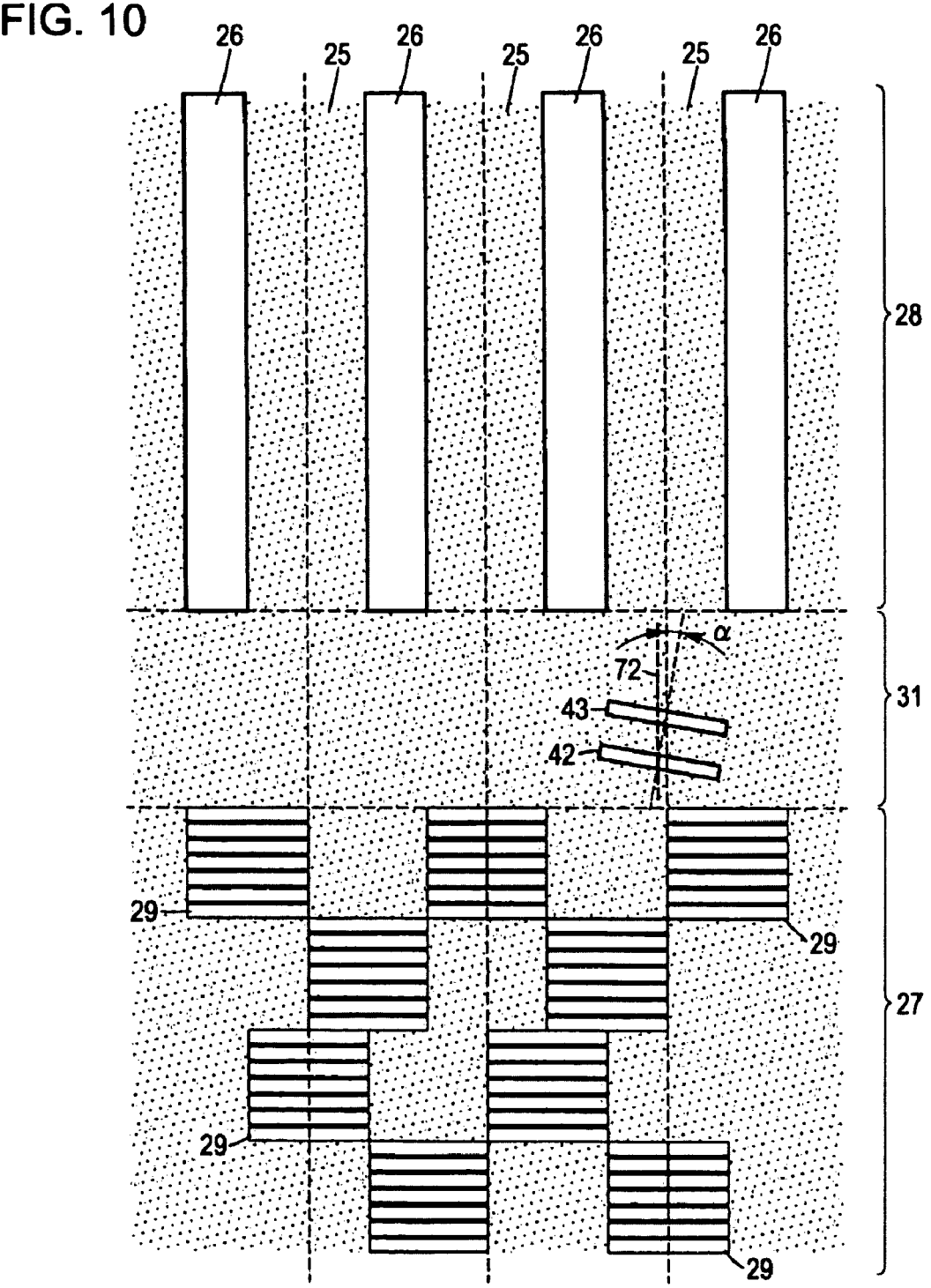
FIG. 10 is a plan view schematically showing a state where binary information is written on a second track.

In step S3, the system controller 61 outputs a positioning signal to the VCM 23 for positioning the read head element 43 on a recording track 25 adjacent to the inner periphery side of the first designated recording track 25. Referring to FIG. 10, the read head element 43 is positioned on a center line of the recording track 25 at the inner periphery side. As a result, the single-pole-type head 42 is positioned on a second track 72 in the signal-profile measurement region 31. In step S4, the system controller 61 outputs a predetermined write signal to the single-pole-type head 42. Based on the write signal, the single-pole-type head 42 writes binary information on the second track 72. The phase of, or namely, the orientation of magnetization of the binary information written on the second track 72 may be set opposite to the orientation of magnetization of the first track 71 that is adjacent to the second track 72 in the radial direction of the magnetic disk 14.

Figure 11:
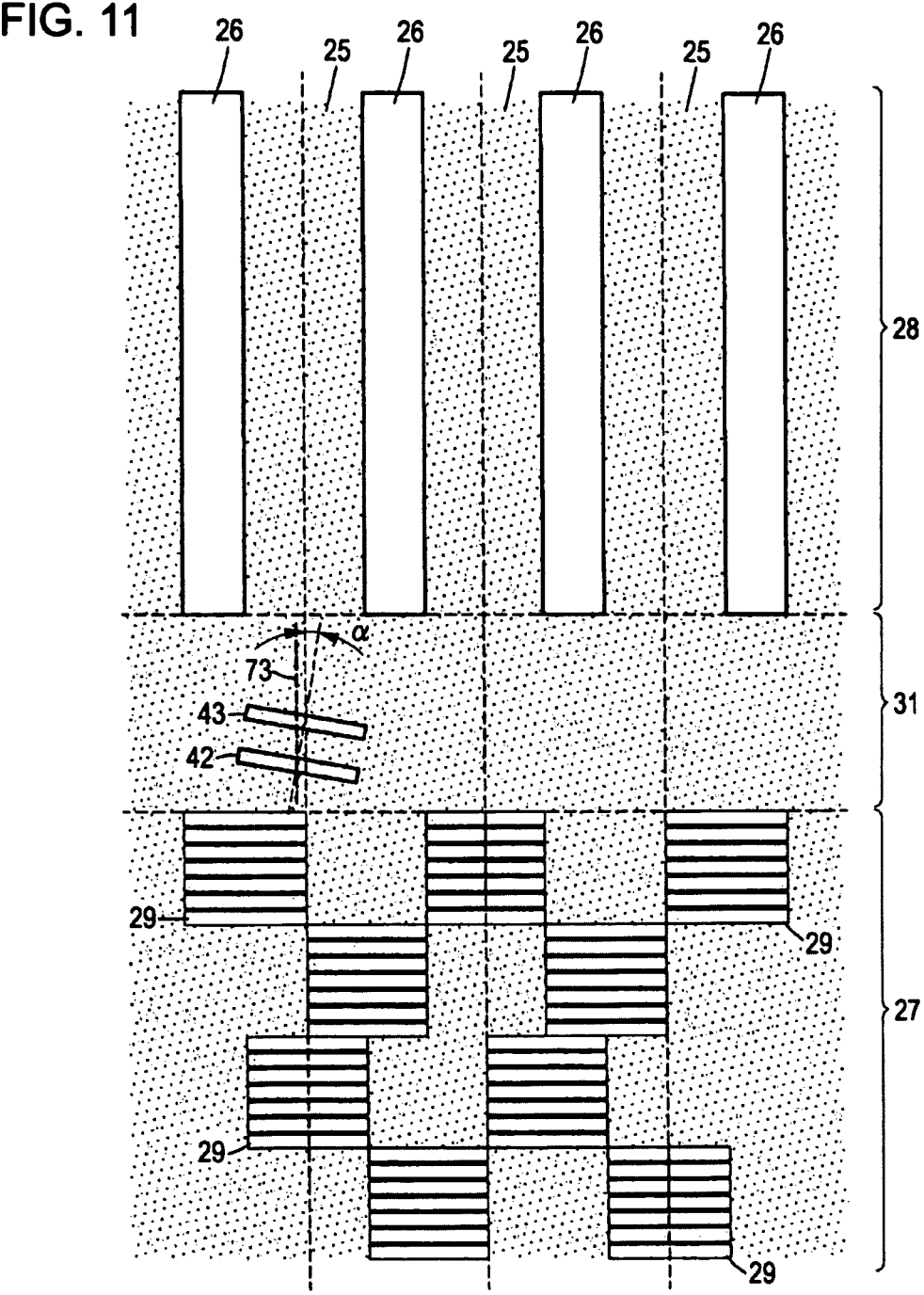
FIG. 11 is a plan view schematically showing a state where binary information is written on a third track.

In step S5, the system controller 61 outputs a positioning signal to the VCM 23 for positioning the read head element 43 on a recording track 25 adjacent to the outer periphery side of the first designated recording track 25. Referring to FIG. 11, the read head element 43 is positioned on a center line of the recording track 25 at the outer periphery side. As a result, the single-pole-type head 42 is positioned on a third track 73 in the signal-profile measurement region 31. In step S6, the system controller 61 outputs a predetermined write signal to the single-pole-type head 42. Based on the write signal, the single-pole-type head 42 writes binary information on the third track 73. In this case, the phase of, or namely, the orientation of magnetization of the binary information written on the third track 73 may be set opposite to the orientation of magnetization of the first track 71 that is adjacent to the third track 73 in the radial direction of the magnetic disk 14.

Subsequently, in step S7, the system controller 61 outputs a positioning signal to the VCM 23 for positioning the read head element 43 on the first designated recording track 25. Based on the servo signal, the read head element 43 is positioned on the center line of the first recording track 25 located in the middle. In step S8, the system controller 61 outputs a sensing current to the read head element 43. In accordance with the sensing current, the read head element 43 reads binary information from the first track 71. An output value of the binary information is temporarily stored in the memory 62. The system controller 61 then shifts the read head element 43 by a predetermined distance in the radial direction of the magnetic disk 14. At this time, the read head element 43 reads binary information from the first track 71. Consequently, the reading process of binary information is repeated between positions on the first track 71 that are separated by an arbitrary distance in the radial direction of the magnetic disk 14. The output values of binary information read at the individual positions are temporarily stored in the memory 62.

Figure 12:
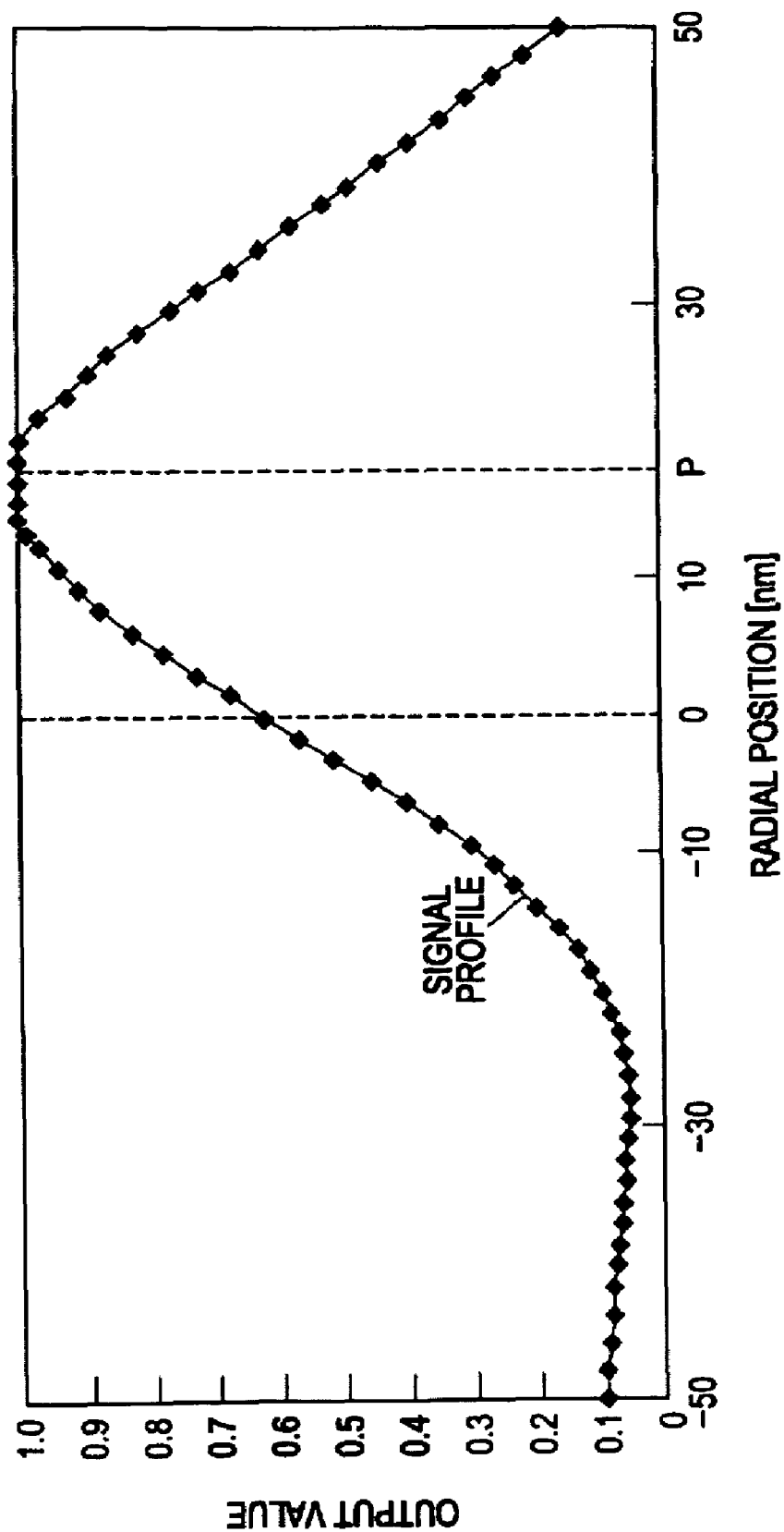
FIG. 12 is a graph showing a signal profile.

As a result, the system controller 61 determines a signal profile in step S9, as shown in FIG. 12. A signal profile indicates a fluctuation in the output values of binary information read at the respective positions on the first track 71. The system controller 61 detects a peak position P that indicates a maximum output value in the signal profile. The signal profile is temporarily stored in the memory 62. Because the first track 71 is adjacent to both the second track 72 and the third track 73, a recording magnetic field acting on the second track 72 and the third track 73 affects the first track 71. This effect weakens the magnetization of the first track 71. Accordingly, in the signal profile, the output values become smaller with increasing distance from the peak position P in the radial direction of the magnetic disk 14.

In step S10, the system controller 61 detects a distance from the center line of the recording track 25 to the peak position P. This distance corresponds to the offset amount of the single-pole-type head 42 at the time of the writing process of binary information. The detected distance is stored in the memory 62 as the compensation information 64. In step S11, the system controller 61 checks whether there are other regions on the magnetic disk 14 for which offset amounts should be calculated. In this case, the recording track 25 at the inner periphery side is selected on the magnetic disk 14. As a result, the process starting from step S1 is repeated on the recording track 25 at the inner periphery side in the similar manner to the above. Subsequently, when it is confirmed that offset amounts have been calculated for all of the desired regions, the offset-amount calculation process ends.

In the HDD 11 described above, the recording track 25 in the middle receives an effect of magnetization from the neighboring recording tracks 25. The signal profile is determined on the basis of three tracks, which are the first to third tracks 71 to 73. A maximum output value is determined based on the peak position P of the signal profile. Consequently, at the time of the writing process of binary information, the single-pole-type head 42 is shifted in the radial direction by the aforementioned offset amount so that the peak position P is established on the center line of the recording track 25. This allows the read head element 43 to have the capability to read binary information with higher precision than before. In recent years, the distance between recording tracks 25, that is, the track pitch, is becoming shorter and shorter with improvements in recording densities. The present invention is especially effective in such cases. In contrast, the HDDs of the related art determine a signal profile on the basis of a single track, and tracks are not established on opposite sides of the track. Therefore, the HDDs of the related art are not at all designed in view of the effect from neighboring recording tracks 25.

In addition to the so-called discrete track medium, the present invention can also be applied to a normal magnetic disk that has a uniformly extending recording film. The present invention can also be applied to a so-called patterned medium. In a patterned medium, magnetic components are arranged at regular intervals in the circumferential direction of a magnetic disk, and are separated from each other by nonmagnetic components. Arrays of these magnetic components constitute recording tracks. Binary information is recorded on the magnetic components.

What is claimed is:

1. A write-head positioning method comprising steps of:
    positioning a write head on a first track of a storage medium on the basis of a servo signal read by a read head and writing a signal on the first track;
    positioning the write head on second and third tracks located adjacent to opposite sides of the first track on the basis of servo signals read by the read head and writing signals on the second track and the third track;
    positioning the read head at positions on the first track that are set at a predetermined interval in a track-width direction, and reading a signal from the first track at each position thereof;
    determining a signal profile that indicates a fluctuation of output values of the signals read at the respective positions on the first track; and
    detecting a peak position indicating a maximum output value in the determined signal profile.

2. The write-head positioning method according to claim 1, wherein a phase of the signal written on the first track differs from phases of the signals written on the second track and the third track that are adjacent to the signal in the track-width direction.

3. The write-head positioning method according to claim 1, wherein the signal profile is determined by performing detection at a plurality of positions on the storage medium.

4. A disk drive comprising:
    a storage medium;
    a head slider having a write head and a read head;
    a controller positioning the write head on a first track of said storage medium on the basis of a servo signal read by a read head and writing a signal on the first track, positioning the write head on second and third tracks located adjacent to opposite sides of the first track on the basis of servo signals read by the read head and writing signals on the second track and the third track, positioning the read head at positions on the first track that are set at a predetermined interval in a track-width direction, reading a signal from the first track at each position thereof, determining a signal profile that indicates a fluctuation of output values of the signals read at the respective positions on the first track, and detecting a peak position indicating a maximum output value in the determined signal profile.

5. The disk drive according to claim 4, wherein a phase of the signal written on the first track differs from phases of the signals written on the second track and the third track that are adjacent to the signal in the track-width direction.

6. The disk drive according to claim 4, wherein the signal profile is determined by performing detection at a plurality of positions on said storage medium.

* * * * *